United States Patent [19]

Sawafuji et al.

[11] Patent Number: 5,460,509
[45] Date of Patent: Oct. 24, 1995

[54] APPARATUS FOR INJECTION MOLDING

[75] Inventors: Tohsuke Sawafuji; Yukihide Kasuya, both of Sendal, Japan

[73] Assignee: Yugen Kaisha Sawafujisekkei, Sendal, Japan

[21] Appl. No.: 195,033

[22] Filed: Feb. 14, 1994

[30] Foreign Application Priority Data

Feb. 25, 1993 [JP] Japan .................................. 5-061039

[51] Int. Cl.⁶ .................................................. B29C 45/40
[52] U.S. Cl. ............................................ 425/556; 264/334
[58] Field of Search .............................. 425/553, 555, 425/556; 264/334

[56] References Cited

FOREIGN PATENT DOCUMENTS

| 123031 | 7/1982 | Japan | 425/553 |
| 151013 | 8/1985 | Japan | 425/556 |
| 264217 | 12/1985 | Japan | 425/556 |
| WO93/24298 | 12/1993 | Japan | 425/555 |

*Primary Examiner*—Tim Heitbrink
*Attorney, Agent, or Firm*—Ronald R. Snider

[57] ABSTRACT

Molten plastic is filled in closed a movable mold 20 and a stationary mold 30. Before fitting, a regulator 62 is projected into a gate 12. The regulator 62 is placed in a regulator hollow 61 and is driven by a regulator driver 63. After filling molten plastic into a cavity through the gate from a runner, a shutter 42 shuts the gate 12. The shutter 42 is placed in a shutter hollow 41 and is driven by a shutter driver 4. The regulator 62 retreats from the gate 12 to receive the volume of excess plastic at the time the shutter 42 shuts the gate. When the molds open, a molding is separated from the runner 11 and is ejected.

7 Claims, 6 Drawing Sheets

APPARATUS FOR INJECTION MOLDING

CROSS-REFERENCE TO RELATED APPLICATION

This application claims priority benefits under 35 U.S.C Section 119 of Japanese application Serial No. 5-61089, filed Feb. 25th, 1998, the entire disclosure of which is incorporated herein by reference.

BACKGROUND OF THE INVENTION 1. Field of the Invention

This invention relates to an apparatus and a method for injection molding molten material such as plastic, and more particularly, to an apparatus and a method for producing injection molding product separated from a runner in molds, and for injection molding thinly in molds. 2. Description of Related Art In the conventional technique for injection molding, as disclosed in Japanese Patent Laying Open Publication No. Heisei 2-220824, a cutter projects ahead at the same time as a cutter bed retreats, when a movable mold is separated from a stationary mold, so that a cutting edge cuts a gate, then product is separated from a runner automatically.

In another conventional technique for injection molding, as disclosed in Japanese Patent Laying Open Publication No. Heisei 4-288010, a gate cut pin projects ahead and cuts a gate, when molten plastic maintain some plasticity and a skin layer is formed. Then, products are cut from a runner after molten plastic hardens by cooling.

In another conventional technique, a press forming pin projects in a cavity, so that thin plastic is formed between this pin and an against mold surface.

However, in the 2-220824 technique, strong force is needed. It is difficult to cut hardened plastic without strong force, as a gate is cut after forming. Sometimes, broken pieces of plastic scatter when the product is cut by force. It takes much time to remove the pieces.

In the 4-238010 technique, strong force is needed to separate product, as molten plastic is pressed out by a gate cut pin to rise the pressure in the molds, when the gate cut pin projects ahead into molten plastic in case of cutting a gate.

In the thin molding technique, it needs strong force to mold thinly, as molten plastic is pressed out by a pin to rise the pressure in the molds, when a press molding pin projects same as the 4-238010.

SUMMARY OF THE INVENTION

The object of the invention is to provide an apparatus and a method for injection molding which can cut a gate, can mold thinly by weak force to separate molding in the molds easily and can mold thinly easily.

The foregoing object is accomplished with an apparatus for injection molding, comprising: a stationary mold and a movable mold defining a runner, a gate and a cavity between the molds, a shutter hollow leading to said gate, said shutter hollow formed in one of said stationary mold and said movable mold, a reciprocating shutter for said gate, said shutter placed in said shutter hollow, a shutter driver for reciprocating said shutter in said shutter hollow, a regulator hollow leading to said gate, said regulator hollow formed in one of said stationary mold and said movable mold, a reciprocating regulator placed in said regulator hollow, said regulator projecting into said gate an amount filling a volume which is the same as a volume of excess molten material produced when said shutter shuts said gate, and a regulator driver for reciprocating said regulator in said regulator hollow.

Molten material may be any material which can be injection molded, for example, plastic and metal injection mid compounds.

The shutter hollow and the regulator hollow may be formed in one of the stationary mold and the movable mold, however, each hollow is preferred to be formed in the individual mold to utilize space. The positions of the shutter and the regulator are preferred to be near each other, as molten material pressed out by shutter is absorbed by movement of the regulator.

The shutter driver and the regulator driver comprises, for example, air-actuating systems, springs or electric-actuating systems. In air-actuating system, for example, in case that the shutter hollow and the regulator hollow are cylinders, and the shutter and the regulator are pistons which partition the interior of cylinders airtightly, air is sent to either one side of the cylinder or the other side selectively. In electric actuating systems, for example, in case that the shutter and the regulator are plungers, current which magnetize the coil is switched, so that shutter and regulator reciprocate.

The volume of excess molten material equals a volume of molten material pressed out by the shutter projecting into the gate, minus a volume of contracted molten material.

A further object is to provide a control means for sending a signal to said regulator driver to move said regulator into said regulator hollow when said shutter shuts said gate.

The control means is, for example, a limit switch or a microcomputer.

A further object is to provide a shutter having a flat surface at an end, fitting on the opposite mold surface, when said shutter shuts said gate. It is a further object to provide a regulator having length which is contacting the opposite mold surface, and said regulator having a flat surface at the end fitting on the opposite mold surface, when said regulator projects into said gate.

It is a further object to provide a method of injection molding, comprising the steps of: closing a stationary mid and movable mold defining a runner, a gate and a cavity between the molds, projecting said regulator into said gate in said stationary mold and said movable mold, filling molten material into said cavity through said gate from said runner, after a shutting step and a projecting step, shutting said gate by a shutter after the filling step, retreating said regulator from said gate an amount filling a volume which is the same as a volume of excess molten material produced at the time of the shutting step, and opening said stationary mold and said movable mold and ejecting a product from the molds, after the shutting step and the retreating step.

The projecting step is before the filling step, but my it be either before the closing step or after the closing step.

It is another object to provide an apparatus for injection molding, comprising: a stationary mid and a movable mold defining a runner, a gate and a cavity between the molds, a molding member hollow leading to said cavity, a forming member hollow formed in one of said stationary mold and said movable mold, a molding member projectable into said cavity, said forming member reciprocating in said forming member hollow, a forming member driver for reciprocating said forming member in said forming member hollow a regulator hollow leading to said gate, said regulator hollow formed in one of said stationary mold and said movable mold, a reciprocating regulator placed in said regulator hollow, said regulator projecting into said gate an amount filling a volume which is the same as a volume of excess molten material produced when said forming member projects into said cavity, and a reciprocating regulator driver in said regulator hollow The volume of excess molten material equals a volume of molten material pressed out by the molding member projected into the cavity, minus a volume of contracted molten material.

BRIEF DESCRIPTION OF THE DRAWINGS

The above and other objects and features of the invention are apparent to those skilled in the art from the following preferred embodiments thereof when considered in conjunction with the accompanied drawings, in which.

DETAILED DESCRIPTION OF THE PREFERRED EMBODIMENTS

Figure 1:
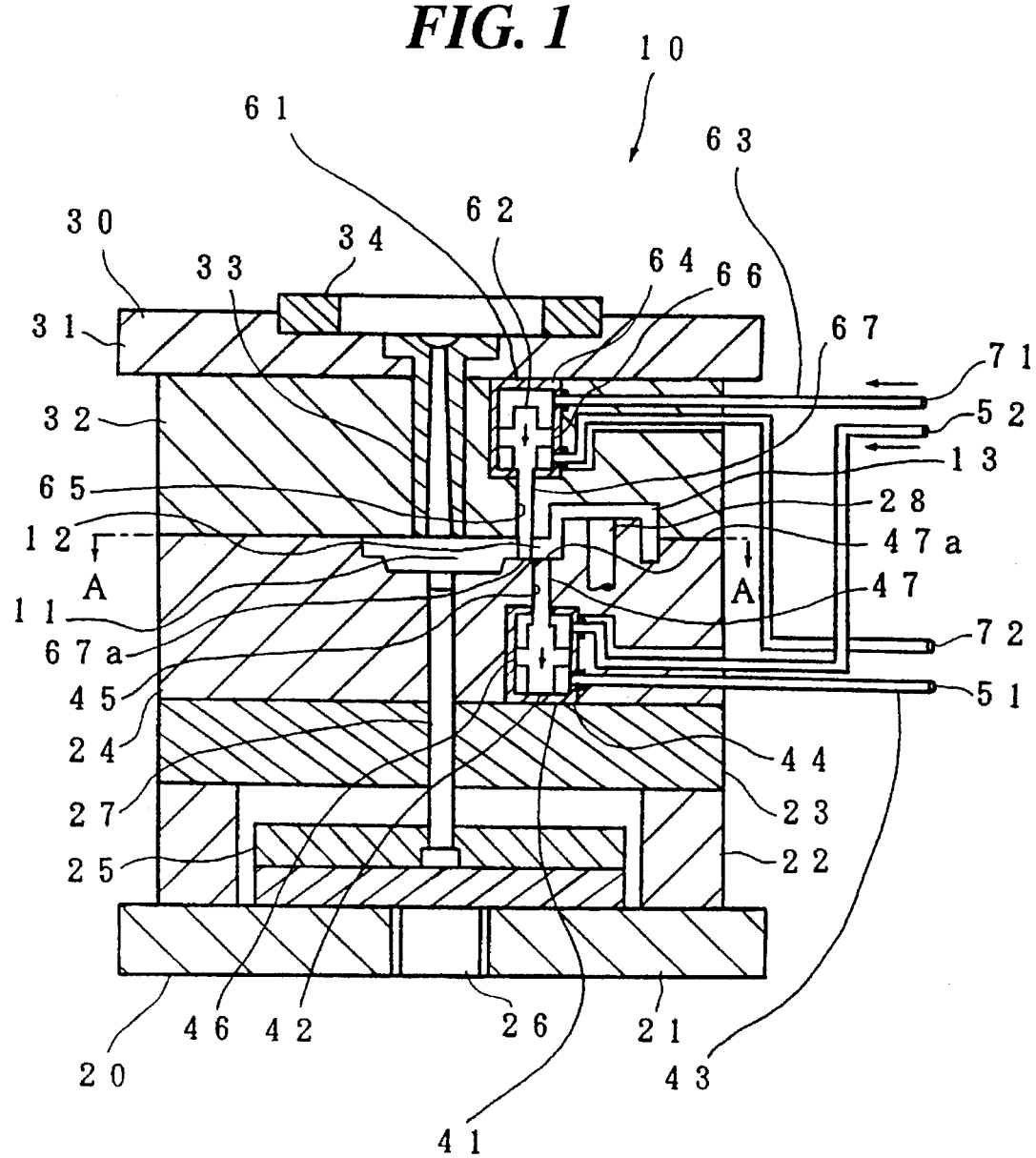
FIG. 1 is a sectional view showing the apparatus for injection molding in closing step to the invention.

Referring to the drawings in detail, an apparatus 10 for injection molding is shown, the apparatus 10 includes a movable mold 20, a stationary mold 30, and control means. The movable mold 20 includes movable mounting plate 21, a spacer block 22, a receiving plate 23, a movable mold plate 24, an ejector plate 25, an ejector rod 26, and ejector pins 27, 28. The stationary mold 30 includes a stationary mounting plate 31, a stationary mold plate 32 a spur bush 33 and a locate ring 34.

In the movable mold 20, the receiving plate 23 is mounted via the spacer block 22 on the mounting plate 21, and the movable mold plate 24 is mounted on the receiving plate 23. The ejector plate 25 is placed reciplocatably between the mounting plate 21 and the receiving plate 23. The ejector plate 25 comprises two plates fixed together and is fixed on the top of the ejector rod 26. The ejector rod 26 is provided through the mounting plate 21 and is reciprocatable by motive power. Each end of the ejector pins 27, 28 is mounted on the ejector plate 25. The reciprocatable ejector pins 27, 28 are provided through the receiving plate 23 and the movable mold plate 24.

In the stationary mold 30, the stationary mold plate 32 is mounted on the stationary mounting plate 31, and the spur bush 33 is provided through them. The locate ring 34 is provided on the stationary mounting plate 31, and encloses the spur bush 33. The movable mold 20 and the stationary mold 30 can be opened and closed relatively by driving the movable mold 20, to define a runner 11, a gate 12 and a cavity 13 between the molds 24, 32 when closing.

The movable mold plate 24 comprises shutter hollow 41, a shutter 42 and a shutter driver 43. The shutter hollow 41 comprises a cylinder 44 fit in a hollow made in the movable mold plate 24; the cylinder 44 and the movable mold plate 24 have a throughhole 45. The throughhole 45 leads to the interior of the cylinder 44 and the gate 12.

The shutter 42 is placed in the shutter hollow 41 reciprocatably. The shutter 42 has an air tight flange 46 which partition the interior of the cylinder 44, and a cutter 47 which can shut the gate 12 through the throughhole 45 airtightly. The position which the cutter 47 shuts the gate 12 is along border line between the gate 12 and the cavity 13.

The cutter 47 has a flat surface 47a at the end, fitting on the opposite mold surface of the stationary mold plate 32, when the cutter 47 shuts the gate 12. The flat surface 47a is on the same level with the mold surface on the movable mold plate 24, when the shutter 42 draws back into the shutter hollow 41 maximumly.

The shutter driver 48 has a shutting air pipe 51 and a drawing air pipe 52 which reciprocates the shutter 42 in the shutter hollow 41. The air pipes 51, 52 are connected to a pump for sending compressed air via a control valve means 80. The air pipes 51, 52 are provided through the interior of the cylinder 44 from the side of the movable mold plate 24. The cutter 47 of the shutter 42 is projected into the gate 12, when compressed air is sent to the interior of the cylinder 44 from the air pipe 51. The cutter 47 draws back from the gate 12, when compressed air is sent to the interior of the cylinder 44 from the air pipe 52.

Figure 6:
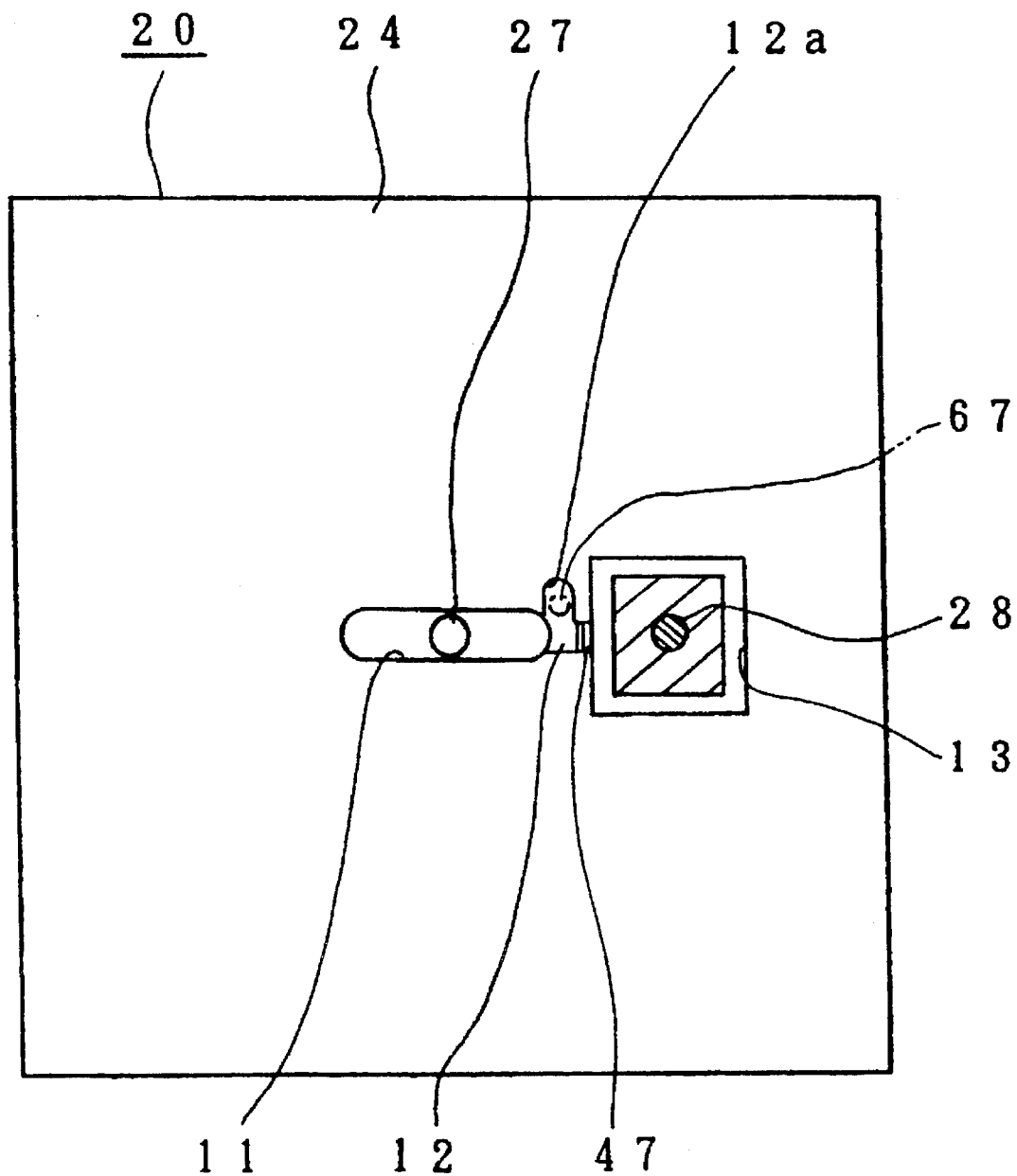
FIG. 6 is a cross section on line A—A of FIG. 1.

The stationary mid plate 82 has a regulator hollow 61, a regulator 62 and a regulator driver 63. The regulator hollow 61 comprises the cylinder 64 fit in a hollow made in the stationary mid plate 32. The cylinder 64 and the stationary mold plate 32 have a throughhole 65. As indicated in FIG. 6, the gate 12 has a hollow 12a deviating from extention to the runner 11, and the throughhole 65 leads to the interior of the cylinder 64 and the gate 12.

The regulator 62 is placed in the regulator hollow 61 reciprocatably. The regulator 62 has an airtight flange 66 which partitions the interior of the cylinder 64, and a pin 67 which partitions the interior of the cylinder 64. The pin 67 can project into the hollow 12a (FIG. 6) of the gate 12 through the throughhole 65 airtightly. The pin 67 has contacts the opposite mold surface of the movable mold plate 24, when the pin 67 projects into the gate 12. The pin 67 has a flat surface 67a at the end, fitting on the opposite mold surface. The flat surface 67a is on the same level with the mold surface on the stationary mold plate 32, when the regulator 62 completely draws back into the regulator hollow 61.

The volume of the portion of the pin 67 projecting into the gate 12 equals the volume of molten material which becomes excess when the shutter 42 shuts the gate 12. The volume of excess molten material equals the volume of molten material pressed out by the shutter 42 projecting into the gate 12, minus the volume of molten material contracted by some cooling. The volume of excess molten material is calculated in consideration of the kind of molten materials and the volumes of the gate 12 and the cavity 13.

The regulator driver 63 has a projecting air pipe 71 and a drawing air pipe 72 which reciprocates the regulator 62 in the regulator hollow 61. The air pipes 71, 72 are connected to the pump same as the air pipes 51, 52 of the shutter driver 43 via a control valve (not shown).

The air pipes 71, 72 are provided through the interior of the cylinder 64 from the side of the stationary mold plate 32. The pin 67 of the regulator 62 is projected into the gate 12, when compressed air is sent to the interior of the cylinder 64 from the air pipe 71. The pin 67 draws back from the gate 12, when compressed air is sent to the interior of the cylinder 64 from the air pipe 72.

The control means comprises a microcomputer which controls the pump and the control valves for the shutter driver 43 and the regulator driver 68 so that compressed air is sent to the air pipes 51, 52 and the air pipes 71, 72 selectively. For example, control means sends a signal to the pump and the control valves to move the pin 67 into the throughhole 65.

The operation of the apparatus 10 is described with reference to FIG. 1 to FIG. 5. As indicated in FIG. 1, when molding, the stationary mold 30 and the movable mold 20 are closed. Compressed air is sent to the drawing air pipe 52 of the shutter driver 43 from the pump to draw back the cutter 47 from the gate 12, and compressed air is sent to the projecting air pipe 71 of the regulator driver 63 from the pomp to project the pin 67 into the gate 12.

At this time, the flat surface 47a of the cutter 47 is on the same level with the mold surface on the movable mold plate 24. The flat surface 67a of the pin 67 is on the same level with the opposite mold surface on the movable mold plate 24. Therefore, when molten plastic is filled, the pin 67 is prevented from being pushed back into the throughhole 65 by the interior pressure.

Figure 2:
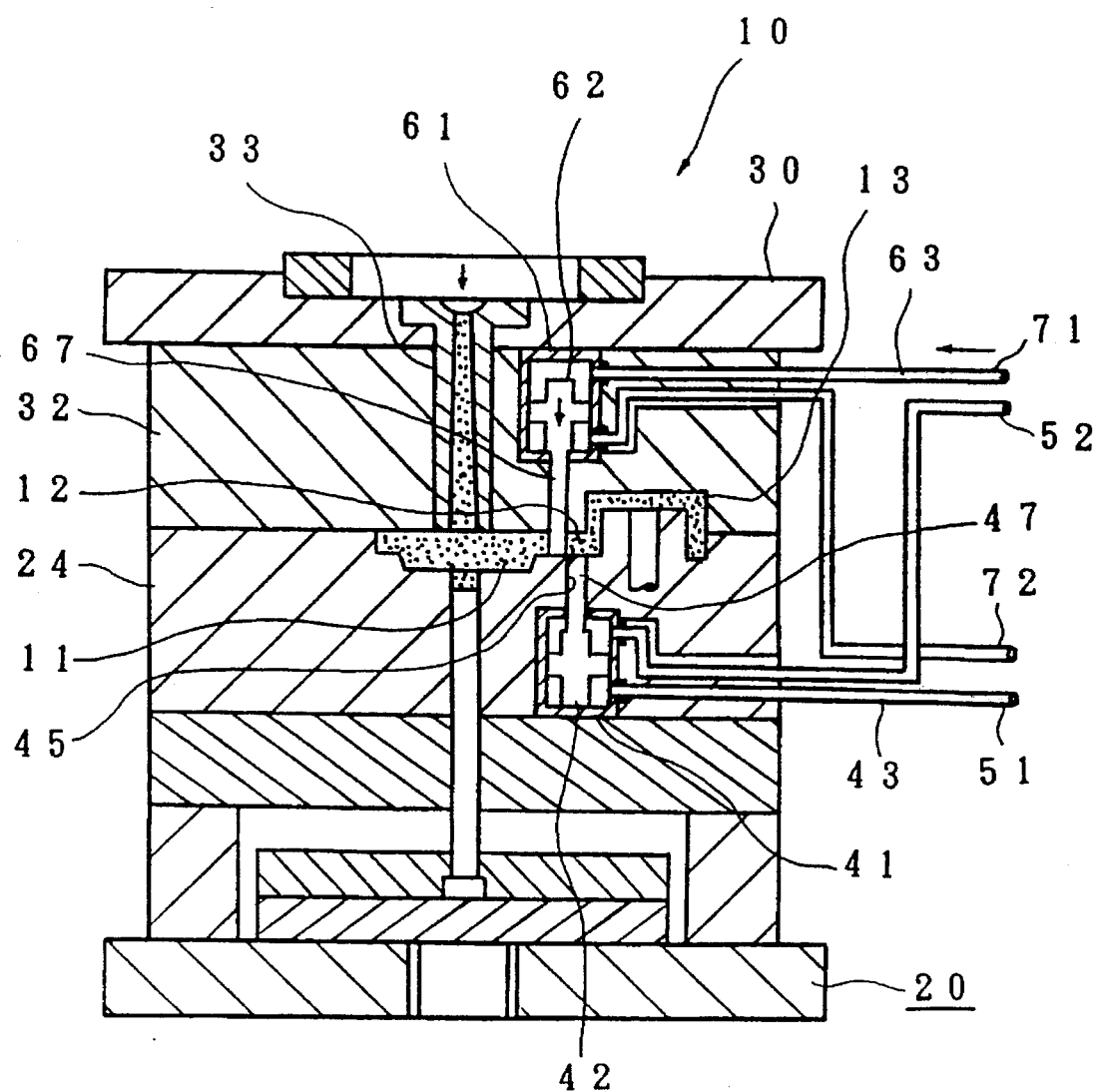
FIG. 2 is a sectional view showing the apparatus in filling step.

After the closing step and the projecting step, molten plastic is injected from nozzle of a molding machine (not shown) into the spur bush 33. As shown in FIG. 2, molten plastic is filled from the runner 11 through the gate 12 into the cavity 13 in filling step. At the time of filling, air being sent to the air pipes 51, 52 is stopped, and the cutter 47 is drawn back into the throughhole 45 by injection pressure of the molten plastic.

Figure 3:
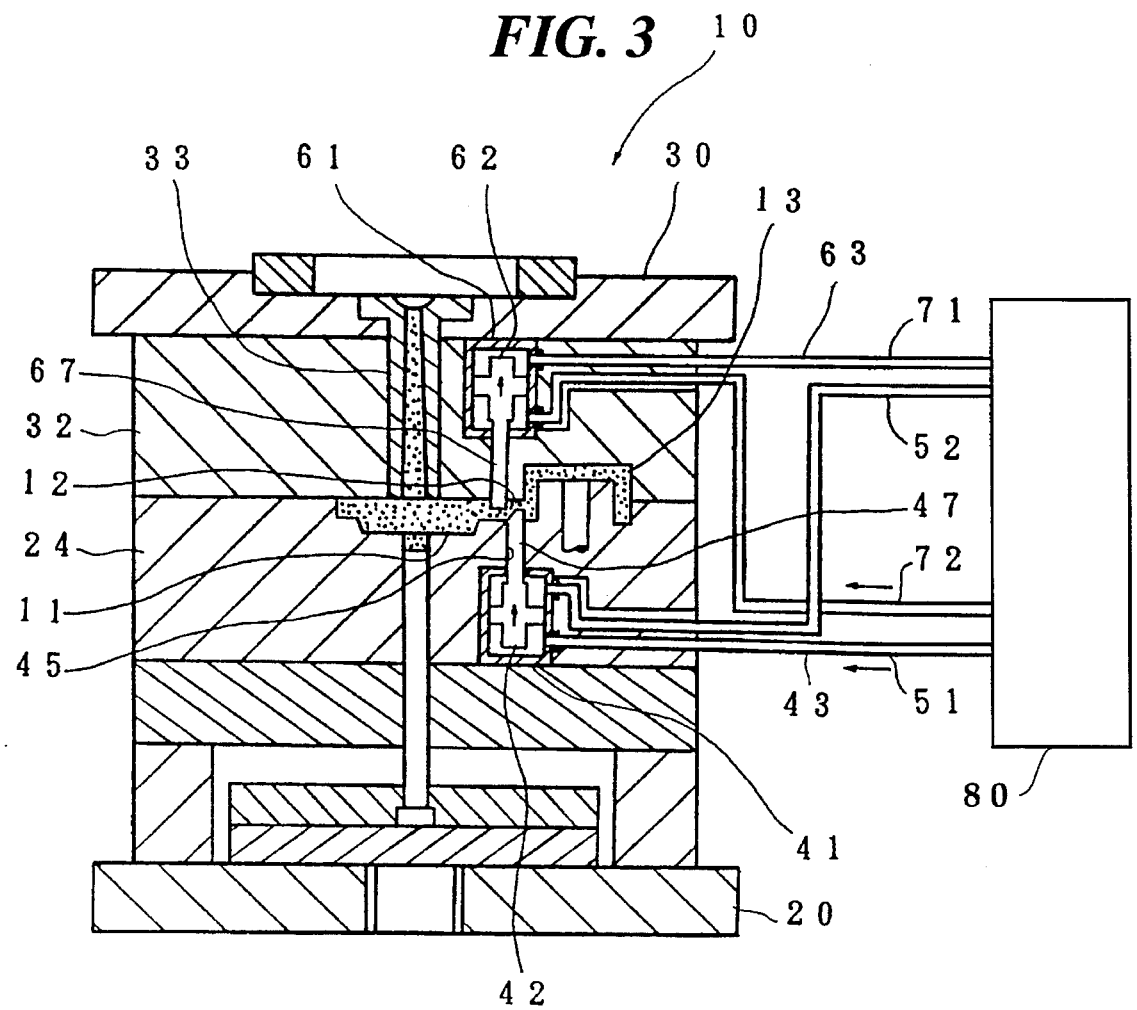
FIG. 3 is a sectional view showing the apparatus in shutting step and retreating step.

Immediately after starting of keeping pressure after the filling step, as shown in FIG. 3, compressed air is sent from the pump to the air pipe 51 of the shutter driver 43 to shut the gate 12 by the cutter 47. The gate 12 is shut before the molten plastic hardens. Therefore, molten plastic in the cavity 13 is separated from the runner 11 easily, and scattering of broken pieces of plastic does not occur when cutting hard plastic.

When the gate 12 is shut, the flat surface 47a of the cutter 47 is on the same level with the opposite mold surface on the stationary mold plate 32. Therefore, molten plastic in the cavity 13 is isolated certainly.

When the gate 12 is shut, at the time that thin film is formed on the surface of plastic, compressed air is sent from the pomp to the drawing air pipe 72 of the regulator driver 63 so that the pin 67 which projected into the gate 12 before filling molten plastic, retreats from the gate 12 an amount filling a volume which is the same as a volume of excess molten plastic in retreating step.

When the cutter 47 advances to the gate 12, some molten plastic is pushed out by the cutter 47 and is absorbed by contracting of cooled molten plastic, and other excess molten plastic is absorbed by retracting of the pin 67. In this result, when the cutter 47 advances to the gate 12, the pressure in the molds almost never rises so that the gate 12 is shut by weak force.

In the retreating step, the cutter 47 is absorbed in the gate 12 with retreating the pin 67 forced into the throughhole 65 by compressed air. However, after taking the end of the pin 67 off the mold surface on the movable mold plate 24, the air pipes 71, 72 open to the atmosphere so that the cutter 47 my be pushed back into the throughhole 65 automatically by the pressure of plastic pushed by the cutter 47.

Figure 4:
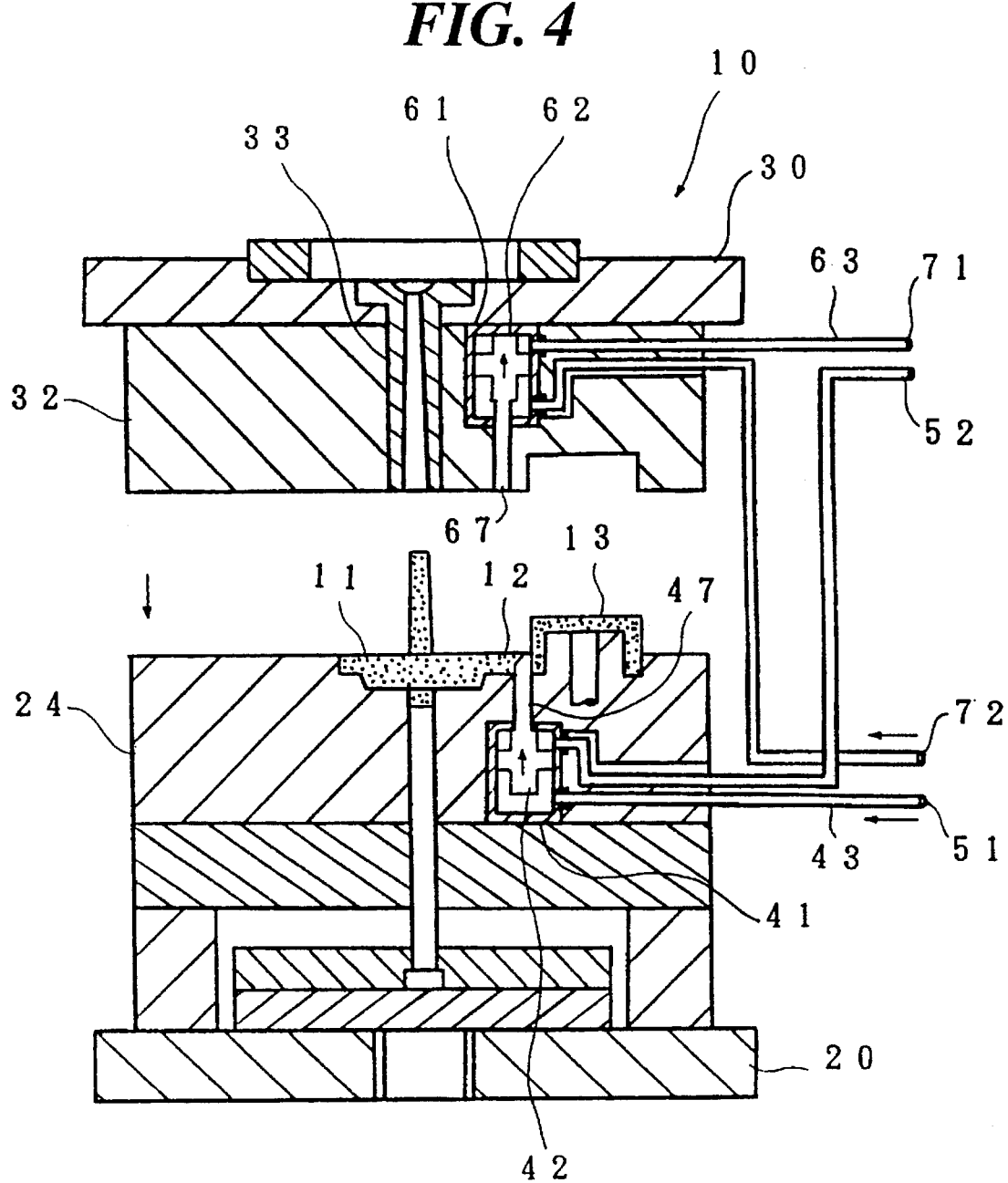
FIG. 4 is a sectional view showing the apparatus in opening step.

After the shutting step and the retreating step and after ending of cooling of the plastic, as shown in FIG. 4, the movable mold 20 and the stationary mold 30 open in an opening step.

Figure 5:
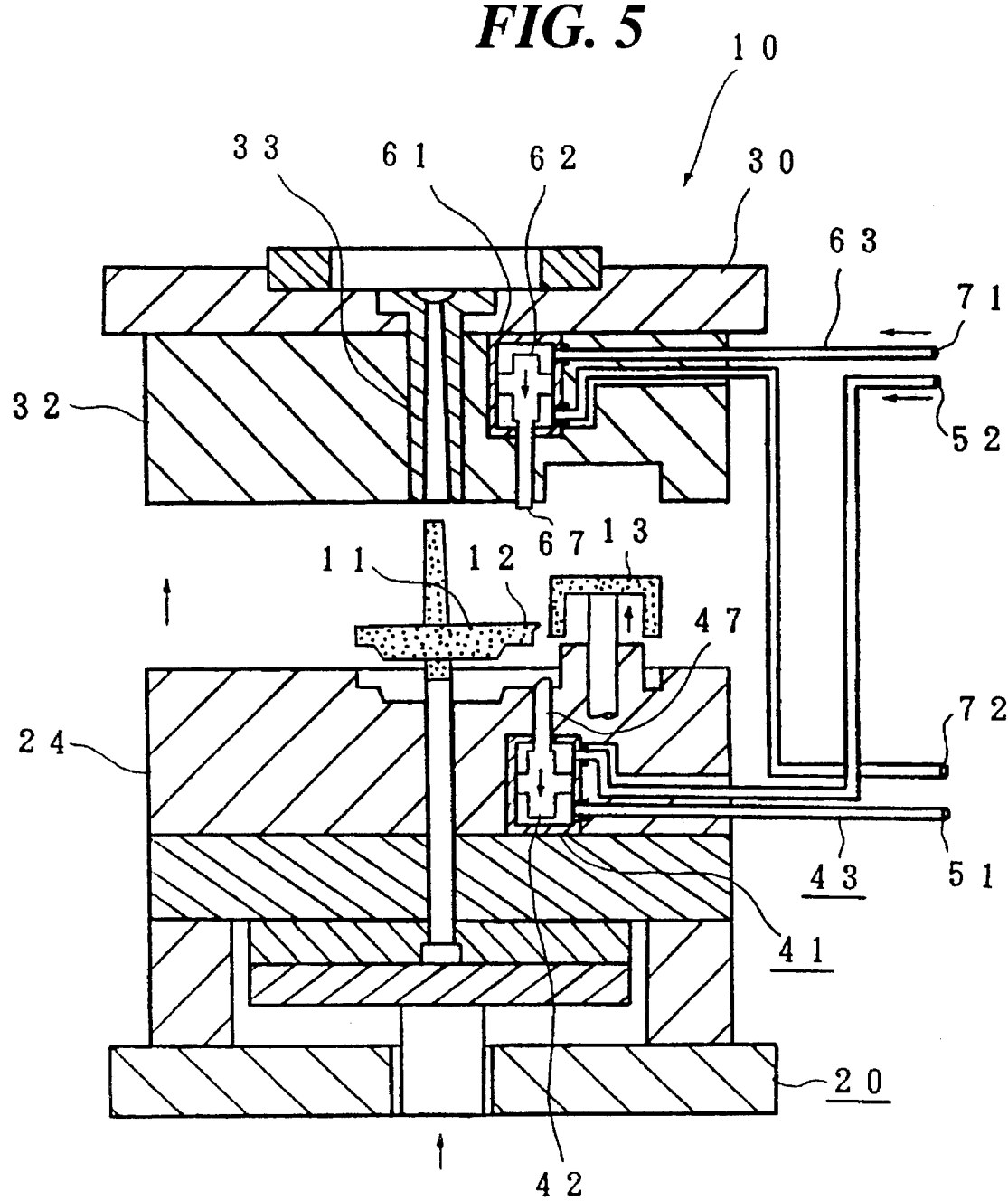
FIG. 5 is a sectional view showing the apparatus in ejecting step.

As shown in FIG. 5, the ejector rod 26 is driven to project the ejector pins 27, 28 via the ejector plate 25 from the movable mold plate 24 in ejecting step. Thus, the molding is separated from the runner 11 and the gate 12 is removed. It is not need to cut molding off the runner 11 after molding.

After removing the molding, at the time of starting the closing step for next molding, the cutter 47 is drawn back from the gate 12 so that the pin 67 is projected into the gate 12. The foregoing steps are repeated so that molding can be mass produced.

The control means switches on-off of the pump of the shutter driver 43 and the regulator driver 63 and the control valves for the air pipes 51, 52, 71, 72. Therefore, it is easy to control the cutter 47 and the pin 67. For example, when the cutter 47 shuts the gate 12 the pump and the control valves which get signal from the control means shift the pin 67 automatically.

In the embodiment, the throughhole 45 of the shutter hollow 41 my lead to the cavity 13 instead of the gate 12. In this case, the shutter hollow 41 will become a molding member hollow in which a molding member projecting into the cavity is placed instead of the shutter 42. And, the shutter driver 43 will become a molding member driver which retreats the regulator 62 an amount filling a volume which is the same as a volume of excess molten material produced when the molding member projects into the cavity 13.

In this case, a pin, the molding member, projects into the cavity 13 so that thin plastic, for example, less than 0.1 mm is formed between this pin and an against the mold surface. At this time, force needed to mold thinly can be made small by retreating the regulator 62 at the time of projecting of the pin. Thus, it is not need to provide extra pressure for the machine for projecting the pin and it is easy to mold thin plastic.

It is understood that although the present invention has been described in detail with respect to preferred embodiments thereof, various other embodiments and variations are possible to those skilled on the art which fall within the scope and spirit of the invention, and such other embodiments and variations are intended to be covered by the following claims.

What is claimed is:

1. An apparatus for injection molding a molten material, comprising:

a stationary mold and a movable mold defining a runner, a gate and a cavity between the molds, a shutter hollow leading to said gate, said shutter hollow formed in one of said stationary mold and said movable mold, a reciprocating shutter for said gate, said shutter placed in said shutter hollow, a shutter driver for reciprocating said shutter in said shutter hollow, a regulator hollow leading to said gate, said regulator hollow formed in a remaining one of said stationary mold and said movable mold, a reciprocating regulator placed in said regulator hollow, said regulator projecting into said gate an amount filling a volume of said gate which is the same as a volume of excess molten material produced when said shutter shuts said gate, and a regulator driver for reciprocating said regulator in said regulator hollow.

2. An apparatus for injection molding in claim 1, further including;

control means for sending signals to said regulator driver to move said regulator into said regulator hollow when said shutter shuts said gate.

3. An apparatus for injection molding in claim 1, wherein said shutter has a flat surface at an end, said flat surface fitting on a first opposite mold surface, whereby when said shutter shuts said gate, said regulator has a length which is contacting a second opposite mold surface, and said regulator having a flat surface at the end fitting on the second opposite mold surface, when said regulator projects into said gate.

4. An apparatus for injection molding in claim 1, wherein said forming member hollow and said regulator hollow are located in opposed one of said molds.

5. An apparatus for injection molding in claim 1, wherein the forming member driver and the regulator driver comprise air actuating systems.

6. An apparatus for injection molding in claim 1, wherein the volume of excess molten material equals the volume of molten material pressed out by the forming member projecting into the gate, minus the volume of contracted molten material.

7. An apparatus for injection molding, comprising:

a stationary mold and a movable mold defining a runner, a gate, and a cavity between the molds, a forming member hollow leading to said cavity, said forming member hollow formed in one of said stationary mold and said movable mold, a forming member projectable into said cavity, said forming member reciprocating in said forming member hollow, a forming member driver for reciprocating said forming member in said forming member hollow, a regulator hollow leading to said gate, said regulator hollow formed in a remaining one of said stationary mold and said movable mold, a reciprocating regulator placed in said regulator hollow, said regulator projecting into said gate an amount filling a volume which is the same as a volume of excess molten material produced when said forming member projects into said cavity, and a reciprocating regulator driver in said regulator hollow.

* * * * *